UNITED STATES PATENT OFFICE.

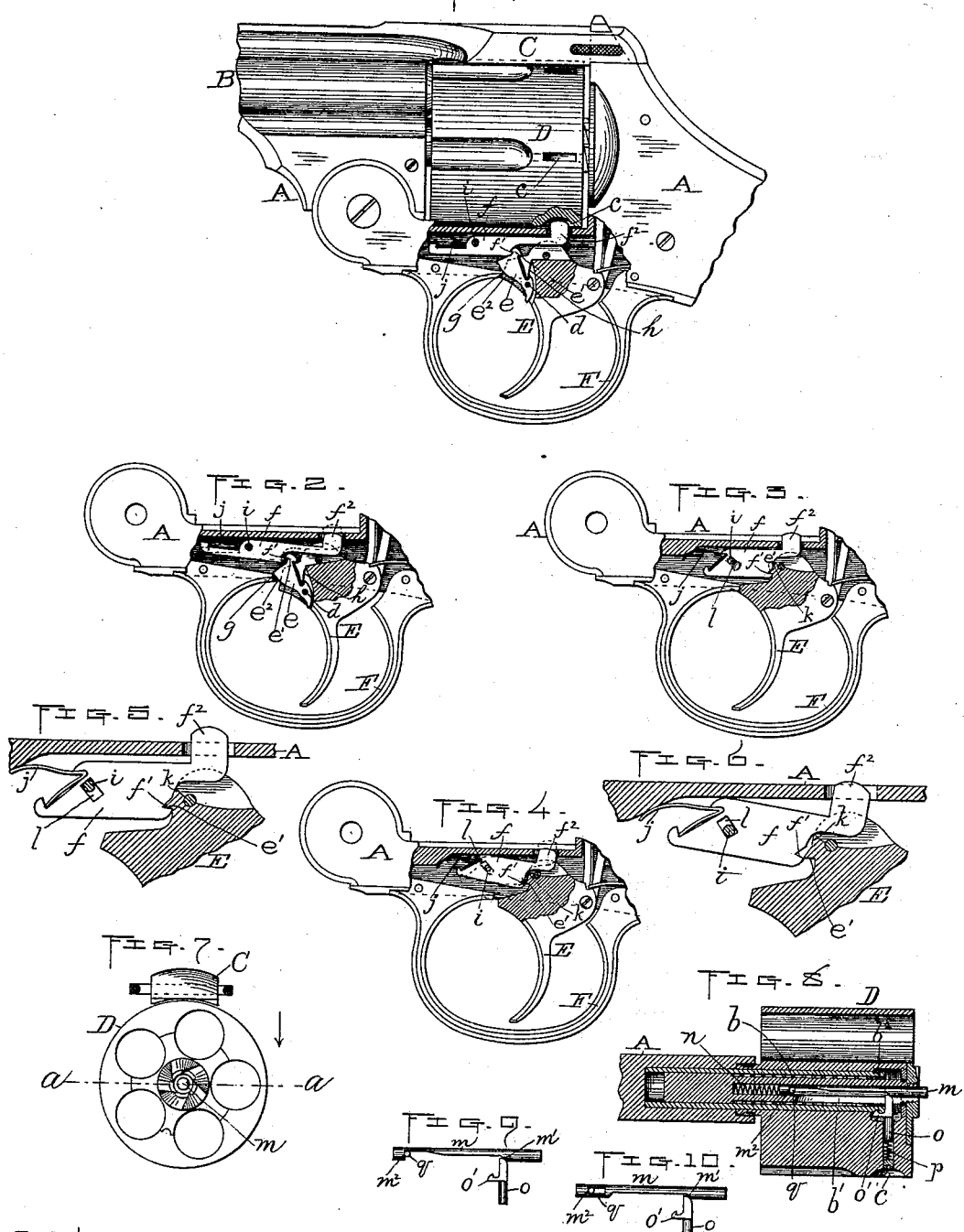

REINHARD T. TORKELSON, OF WORCESTER, MASSACHUSETTS, ASSIGNOR TO IVER JOHNSON, OF SAME PLACE.

REVOLVER.

SPECIFICATION forming part of Letters Patent No. 391,213, dated October 16, 1888.

Application filed August 1, 1888. Serial No. 281,679. (No model.)

*To all whom it may concern:*

Be it known that I, REINHARD T. TORKELSON, of the city and county of Worcester, and State of Massachusetts, have invented certain new and useful Improvements in Revolvers; and I do hereby declare that the following is a full, clear, and exact description thereof, reference being had to the accompanying drawings, forming a part of this specification, and in which—

Figure 1 represents a side view, partly in section, of so much of a revolver as is necessary to illustrate my improvements. Fig. 2 represents a duplication of the lower part of Fig. 1, showing my improved cylinder stop and lock device, hereinafter described, with the various operating parts in the positions that they occupy when the cylinder is unlocked, in Fig. 1 said cylinder being shown locked. Figs. 3 and 4 are similar views to Fig. 2, showing a modification in the construction of said cylinder stop and lock device, the various parts being shown in different positions, as in Figs. 1 and 2. Figs. 5 and 6 are enlarged views of a part of Figs. 3 and 4, respectively. Fig. 7 is a rear end view of the cylinder and barrel-strap of the revolver. Fig. 8 is a central horizontal section through said cylinder, the spindle upon which it turns, and a part of the revolver-frame, taken on line $a$ $a$, Fig. 7, showing my improved device, hereinafter described, for holding said cylinder on the spindle longitudinally. Fig. 9 is a detached side view of part of said cylinder-holding device, and Fig. 10 is a modification thereof.

My invention consists of improvements in the mechanism for stopping and locking the cylinder of a revolver or other fire-arm from rotary motion at the end of each partial revolution thereof and for holding the same in position longitudinally, as hereinafter more fully set forth.

Following is a detailed description of said invention, enabling others to understand the nature and purpose thereof.

In the drawings, A represents part of the frame, B part of the barrel, C the barrel-strap, D the cylinder, E the trigger, and F the trigger-guard, of a revolver.

The cylinder is fitted to turn on the central spindle, $b$, and is provided with the peripheral notches $c$, as usual. It is turned a partial revolution to successively bring each chamber thereof in line with the barrel, and is locked at the end of each partial revolution aforesaid by engaging a stop with said notches, also as usual. The construction whereby said stop is operated to produce said result constitutes my improvement upon this part of the revolver. Said construction is as follows:

To the front side of the trigger E, preferably in a vertical slot therein, is hinged, at $d$, a dog, $e$, which projects forward and up, and is provided upon the front side of its upper end with a notch or shoulder, $e'$, adapted to engage with a corresponding notch or shoulder, $f'$, formed on the rear under side of the stop-lever $f$. Said dog $e$ is also made convex in shape upon its front edge, $e^2$, to form a cam to bear upon the point $g$ of the trigger-guard or an equivalent stationary point, and is further provided with a suitable spring, $h$, for forcing it forward, said spring being in this instance interposed between the backside of the dog and the trigger. The stop-lever $f$ is hinged at $i$ to the frame, and is also provided with a suitable spring, $j$, for forcing its rear catch end, $f^2$, up to engage with the cylinder. The spring is in this instance arranged in front of the pivot $i$, and interposed between the top of the lever and the frame. A flat spring, as shown, is preferable in each case in practice; but I do not limit myself thereto.

In Fig. 1 the various parts are shown in their normal positions, the catch end $f^2$ being engaged with one of the notches in the cylinder, the dog $e$ in engagement with the stop-lever $f$, and the trigger in its forward position. To release said cylinder, the trigger is pulled back, said operation causing the dog $e$ to be pulled down and the stop-lever $f$ with it, so as to bring its upturned end $f^2$ below and out of engagement with the cylinder, as is shown in Fig. 2. In pulling back the trigger, as aforesaid, the cylinder is also turned to bring the next chamber in line with the barrel, and the next notch in position for the stop-lever to engage therewith, as usual. By the time said operation of turning the cylinder is performed said stop-lever is released and sprung up by its spring into engagement with said cylinder again, being thus released by the convex or cam edge $e^2$ bearing against the stationary point $g$ as the dog is drawn down, and thereby causing said dog to be forced back against its spring and disengaging its notch $e'$ from the notch $f'$ on the stop-lever, consequently releasing and admitting of its being sprung up in engagement with the notch in the cylinder, as aforesaid. When the pressure on the trigger is released, the dog readily assumes its normal position again with its notch above that of the stop-lever, as shown in Fig. 1, the lever being rounded under its notch and the dog over its notch to facilitate said operation.

The modification shown in Figs. 3 to 6, inclusive, covers substantially the same principle as the construction already described, the stop-lever being drawn down and released to unlock and lock the cylinder by connection with and operation of the trigger. In this instance the dog on the trigger is left off and connection made direct from said trigger, the trigger being provided with a notch or shoulder corresponding to that on the dog, which engages with the notch on the stop-lever to draw the latter down. The trigger-notch is disengaged from the lever-notch by a cam projection, $k$, on the trigger above its notch coming against and forcing back the lever when said trigger is pulled back, said lever being slotted where its pivot passes through, as shown at $l$, to admit of said back-spring movement, and the lever spring made so as to produce a forward as well as a downward pressure on the front end of said lever, as is fully shown in the drawings.

My improved device for holding the cylinder in position longitudinally is constructed and arranged in the following manner: Said device is arranged partly within both the cylinder and its spindle $b$, said spindle being provided with a central longitudinal opening (see Fig. 8) to receive a longitudinal pin, $m$, and spring $n$, and the cylinder with a transverse opening to receive a transverse hooked pin, $o$, and spring $p$. The longitudinal pin $m$ is cut away or slotted to form the bevel or cam $m'$ and to form a shoulder, $m^2$, which bears against a stationary transverse pin, $q$, for controlling the outward longitudinal movement of said pin $m$. The spring $n$ exerts an outward yielding pressure upon the pin to hold it against said transverse pin $q$, and the transverse pin $o$ in the cylinder extends through a longitudinal slot, $b'$, in the spindle and bears against the cam $m'$ of longitudinal pin $m$. Its inner end is rounded or beveled next to cam $m'$, and said end is kept in contact therewith by the spring $p$ above alluded to. The pin is provided with the hook $o'$, which is adapted to engage with an annular groove, $b^2$, formed on the outer end of the spindle $b$.

In Figs. 8 and 9 I have shown the spindle $m$ cut away wholly on one side to form the cam and shoulder previously described. The same result, however, may be effected by cutting away the side only for the cam, and forming a slot for the pin $q$ to pass through, as is shown in Fig. 10.

By thus constructing and arranging the various parts it is obvious that when in their normal positions, as shown in Fig. 8, the cylinder is securely held from slipping off of its spindle, while at the same time not being in the least retarded from rotary motion thereon. To release said cylinder, the pin $m$ is forced in by pressure upon its outer end, said operation causing the cam $m'$ thereon to force the transverse pin $o$ outward, thereby also moving its hook $o'$ back out of the groove $b^2$ in the spindle, when the cylinder may be easily withdrawn or removed from said spindle in the usual way. This feature of my invention, it will be observed, is both novel and useful. The device being located as described, it does not in the least detract from the symmetry and usual appearance of the fire-arm to which it is applied, and at the same time is conveniently operated to release and remove the cylinder, as aforesaid.

What I claim as new, and desire to secure by Letters Patent, is—

1. In a fire-arm, the combination of the cylinder having the usual peripheral notches, with a stop-lever, $f$, hinged to the frame, having the upturned end $f^2$, adapted to engage with said cylinder-notches, a suitable spring for exerting an upward pressure upon said end $f^2$, and also having a notch or shoulder, $f'$, in its rear under side, the dog $e$, hinged to the trigger, having a suitable spring for exerting a forward pressure thereon, also having the cam-edge $e^2$ and the notch or shoulder $e'$ on the front side at its upper end adapted to engage with the notch $f'$ aforesaid, the trigger E, and the stationary bearing-point $g$, substantially as and for the purpose set forth.

2. In a fire-arm, the combination of the stop-lever $f$, hinged at $i$ to the frame and having a suitable spring for forcing up its rear upturned end, $f^2$, also having a notch or shoulder, $f'$, in its rear under side, with the dog $e$, hinged at $d$ to the trigger, having a suitable spring for forcing it forward, also having the cam-edge $e^2$ and the notch or shoulder $e'$ on the front side of its upper end adapted to engage with the notch $f'$ aforesaid, the trigger E, and the stationary bearing-point $g$, substantially as and for the purpose set forth.

3. In a fire-arm, the combination of the stop-lever $f$, hinged to the frame, also having the upturned rear end, $f^2$, the notch or shoulder $f'$ in its rear under side, and a suitable spring for forcing up said rear end, $f^2$, with the trigger E, having a cam and notch or shoulder adapted to engage with the aforesaid stop-lever $f$, whereby when it is pulled back the rear end of said stop-lever is at first drawn down and then released, substantially as and for the purpose set forth.

4. In a fire-arm, the combination of the cylinder having a transverse opening therein, and the cylinder-spindle having a longitudinal opening and slot, and the stationary transverse pin or its equivalent, with the spindle $m$, having the cam $m'$ and shoulder $m^2$, and a suitable spring for forcing it outward, and pin $o$, having its inner end rounded or beveled next to the aforesaid cam, also having the hook $o'$, adapted to engage with the annular groove $b^2$ in the spindle $b$, and a suitable spring for forcing said pin inward, substantially as and for the purpose set forth.

5. In a fire-arm, the combination of the pin $m$, fitted in a longitudinal opening in the outer end of the cylinder-spindle, and having a cam, $m'$, also having means for forcing the same outward and for controlling its outward movements, with a pin, $o$, fitted in a transverse opening in the cylinder, whose inner end fits in a longitudinal slot in the spindle when the cylinder is in position thereon, and which end is rounded or beveled next to and fits against said cam $m'$, said pin $o$ also having a hook $o'$ adapted to engage with an annular groove, $b^2$, in the outer end of the spindle, and means for forcing the pin inward, substantially as and for the purpose set forth.

REINHARD T. TORKELSON.

Witnesses:
W. B. NOURSE,
LUCIUS W. BRIGGS.